US006862575B1

(12) United States Patent
Anttila et al.

(10) Patent No.: US 6,862,575 B1
(45) Date of Patent: Mar. 1, 2005

(54) ELECTRONIC COUPON SYSTEM (75) Inventors: Akseli Anttila, Helsinki (FI); Suresh Chande, Helsinki (FI); Mikko Mäkipää, Helsinki (FI); Isto Männistö, Helsinki (FI)

(73) Assignee: Nokia Corporation, Espoo (FI)

( * ) Notice: Subject to any disclaimer, the term of this patent is extended or adjusted under 35 U.S.C. 154(b) by 588 days.

(21) Appl. No.: 09/640,011

(22) Filed: Aug. 17, 2000

(51) Int. Cl.[7] .............................................. G06F 17/60
(52) U.S. Cl. ....................................................... 705/14
(58) Field of Search ....................................... 705/1, 14

(56) References Cited

U.S. PATENT DOCUMENTS

| | | |
|---|---|---|
| 4,825,045 A | 4/1989 | Humble |
| 4,908,761 A | 3/1990 | Tai |
| 4,910,672 A | 3/1990 | Off et al. |
| 4,996,642 A | 2/1991 | Hey |
| 5,053,957 A | 10/1991 | Suzuki |
| 5,056,019 A | 10/1991 | Schultz et al. |
| 5,173,851 A | 12/1992 | Off et al. |
| 5,201,010 A | 4/1993 | Deaton et al. |
| 5,327,508 A | 7/1994 | Deaton et al. |
| 5,353,218 A | 10/1994 | De Lapa et al. |
| 5,353,219 A | 10/1994 | Mueller et al. |
| 5,481,094 A | 1/1996 | Suda |
| 5,502,636 A | 3/1996 | Clarke |
| 5,504,675 A | 4/1996 | Cragun et al. |
| 5,523,794 A * | 6/1996 | Mankovitz et al. ............ 705/14 |
| 5,576,951 A | 11/1996 | Lockwood |
| 5,583,763 A | 12/1996 | Atcheson et al. |
| 5,592,560 A | 1/1997 | Deaton et al. |
| 5,612,868 A | 3/1997 | Off et al. |
| 5,615,342 A | 3/1997 | Johnson |
| 5,621,812 A | 4/1997 | Deaton et al. |
| 5,625,776 A | 4/1997 | Johnson |
| 5,638,457 A | 6/1997 | Deaton et al. |
| 5,649,114 A | 7/1997 | Deaton et al. |
| 5,710,887 A | 1/1998 | Chelliah et al. |
| 5,715,399 A | 2/1998 | Bezos |
| 5,761,648 A | 6/1998 | Golden et al. |
| 5,797,126 A | 8/1998 | Helbling et al. |
| 5,832,457 A | 11/1998 | O'Brien et al. |
| 5,870,030 A | 2/1999 | DeLuca et al. |
| 6,009,411 A | 12/1999 | Kepecs |
| 6,026,370 A | 2/2000 | Jermyn |
| 6,035,280 A | 3/2000 | Christensen |
| 6,055,513 A | 4/2000 | Katz et al. |
| 6,055,573 A | 4/2000 | Gardenswartz et al. |
| 6,067,524 A | 5/2000 | Byerly et al. |
| 6,076,068 A | 6/2000 | DeLapa et al. |
| 6,112,981 A | 9/2000 | McCall |
| 6,123,259 A | 9/2000 | Ogasawara |
| 6,336,099 B1 * | 1/2002 | Barnett et al. ................. 705/14 |
| 6,505,046 B1 * | 1/2003 | Baker ....................... 455/456.3 |

FOREIGN PATENT DOCUMENTS

| | | |
|---|---|---|
| JP | 057210 A | 2/2000 |
| WO | WO039657 | 6/2000 |

* cited by examiner

Primary Examiner—Jeffrey D. Carlson
(74) Attorney, Agent, or Firm—Antonelli, Terry, Stout & Kraus, LLP

(57) ABSTRACT

A system for issuing electronic coupons. A master coupon is provided by a service which may be copied by customers and placed into their individual electronic wallets. The coupons may have a variable benefit or value which may be established by a variety of parameters. The parameters include a set time period, certain action by the customer, the purchase of specific items, the purchase of specific dollar values, or external parameters such as the score in a baseball game. The coupons may be transferred or recopied by the customer as desired. The customer may gain additional benefits by recopying the coupons to others.

22 Claims, 9 Drawing Sheets

ELECTRONIC COUPON SYSTEM

BACKGROUND OF THE INVENTION

1. Field of the Invention

This invention relates generally to an electronic coupon system and, more particularly, to an electronic coupon system where the coupon is shareable and the benefit obtained from the coupon is changeable.

2. Discussion of the Prior Art

Commercial enterprises have long utilized some form of paper certificate to provide benefits to their customers. These are often referred to as coupons and typically have been distributed in advance or at the store so that the customer can receive a price reduction or receive an extra product with a given purchase. The stores have also given a form of stamps which can be collected to be redeemed for cash or other products at a later time. These stamps are awarded based on the amount of money spent by the customer. Other types of paper certificates have also been used.

In more recent times, this concept has been expanded to a type of electronic certificate or coupon. Thus, one simple system is to allow a customer to print his own coupon after visiting a web site of the store.

However, more involved systems have been proposed which are totally electronic. Thus, a server can electronically store coupons that the customer has earned so that they can be redeemed later. There are several advantages to the merchant in using a system such as this. First, it is possible to record information about the customers using the coupons so that later marketing can be properly directed. Also, it is a simple procedure to create and revise offers. A great benefit is also provided in that the coupons do not need to be mailed, thus saving postage costs.

U.S. Pat. No. 5,761,648 shows such a system. A data processing system is used to dispense coupons on line. In this system, the server can display active coupon files to a customer who may then download coupons as desired. Coupons may be redeemed either by printing the coupon out at the customer's personal computer or by having the coupon stored electronically under the customer's name so that it can be redeemed at the store automatically.

Systems such as these are valuable, but have limited flexibility in their usage. Once the coupon is issued to a customer, its benefit is set and no further adjustments may be made. The systems also do not provide the ability for a customer to "share" his coupon by allowing a friend to copy the coupon from him. The systems also do not provide the flexibility of using a wireless device to implement the systems and to store the coupons.

SUMMARY OF THE INVENTION

Accordingly, one object of the present invention is to provide a system for receiving and storing electronic coupons wherein the benefit of the coupon is changeable.

Another object of this invention is to provide an interactive system for dispensing and controlling electronic certificates where the certificates may be shared or transferred among users.

A still further object of this invention is to provide an electronic coupon system where the value of the coupon changes according to various parameters, either determined by outside influences or controlled by the customer for example by sharing the coupon to other people.

A still further object of this invention is to provide a computer system having a server for establishing an electronic coupon system whereby coupons have various levels of benefits, which can be transferred or shared to other customers and which can be stored for use later.

Another object of this invention is to provide an electronic coupon system where a server establishes the coupons and which may be stored in a portable device using a wireless network and which may be presented to a business using the portable device.

Briefly, these and other objects of the invention are achieved by providing a server which issues coupons established by a business and as requested by a potential customer and for storing coupons for customers. The coupons have various levels of benefits and may become active or inactive with either the benefit level or activity based on conditions established by the customer or by external influences. The coupons may be shared with others and may be stored in a portable device for carrying the coupons to the business.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
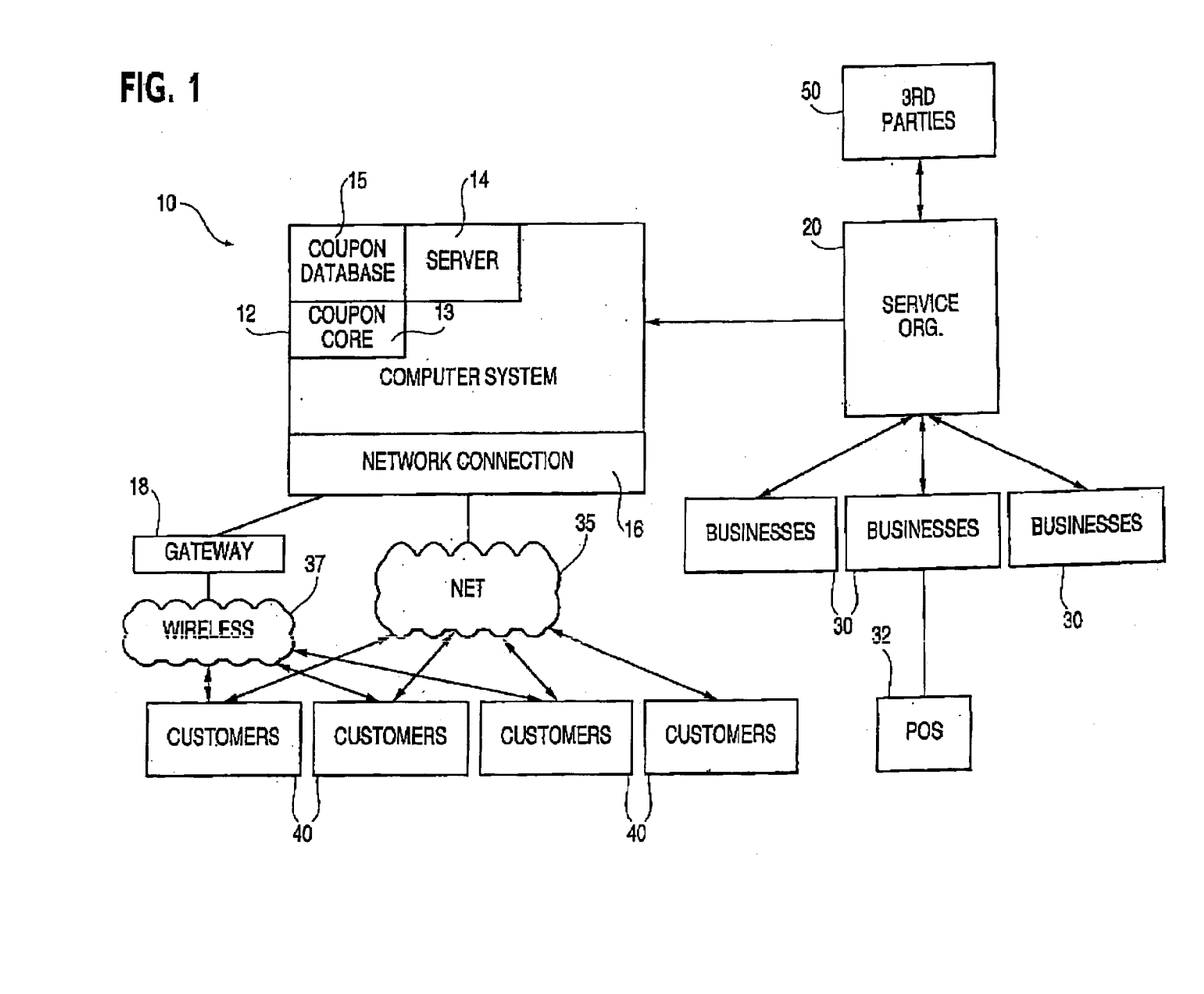
FIG. 1 is a schematic diagram showing the relationship between the various parties in the system.

Referring now to the drawings, wherein like reference numerals designate identical or corresponding parts throughout the several views, and more particularly to FIG. 1 thereof, wherein the arrangement of the electronic coupon system 10 is shown. The system includes a simple data processing system 12 containing at least a server 14, a coupon system including a coupon core 13 and a coupon database 15, and a network connection 16, such as an internet connection. The system is controlled by a coupon service organization 20 whose sole function is to manage the data processing system and to interface between the various businesses which wish to use the system. The service directly controls the processing system either on site through standard input/output devices or at a distance through internet connections. The service also interacts with various businesses 30 who use the service to provide coupons to their customers. The businesses may be connected to the service by any standard communication means including personal instructions, letter, telephone or through a wired or wireless network service. The businesses may have point of sale terminals, POS, 32 for use by their checkout clerks.

Customers 40 are connected to the system through an internet service 35. This may take the form of a standard wired connection through any of the usual internet services. They may also be connected by the use of a wireless device connected to a wireless network 37 through a gateway 18. The terminal used may be owned by the customer or may be present at the store, the coupon service office or at a public location, such as a mall. Customers may take their purchases to POS 32 for that particular business.

It is also possible that a third party 50 may be involved and provide information or instructions to the service. Thus, the third party may be involved with the business 30 issuing the coupons in a joint marketing effort, or the third party may merely be providing trigger events to change the value of the coupons. The third party may provide content (such as news) where the coupons are embedded as banners or otherwise publish the coupons to potential customers using e.g., coupon catalogues.

Figure 2:
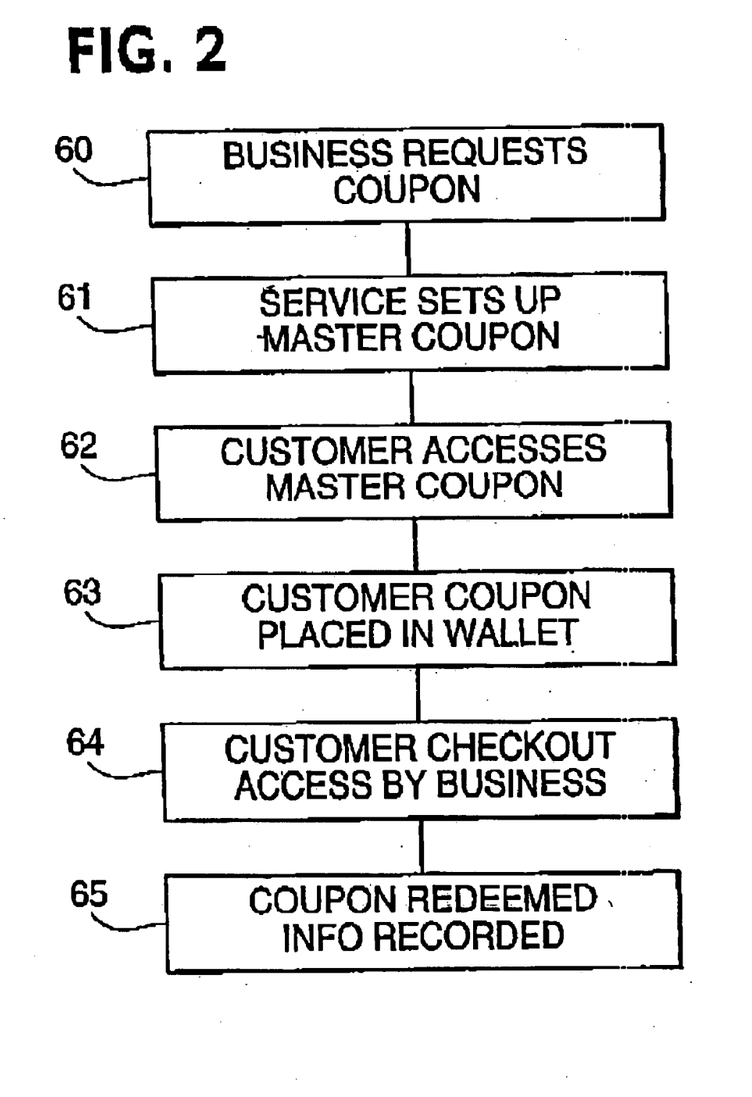
FIG. 2 is a flow chart showing the steps of the basic embodiment of the present invention.

The system operates in the following manner, as shown in FIG. 2. When a business wishes to provide coupons to their customers, they indicate certain information to the service such as the benefit which the coupon will provide, the conditions under which the coupon is given, various other aspects of the coupon such as whether it may be shared or transferred, the beginning and ending dates for using the coupon and any information regarding which customers should receive the coupon as shown in step 60.

The service then controls the data processing system so that a master coupon is placed in a location identified with that business such as in their website. The master coupon is a template from which individual customer coupons can be formed. This is shown as step 61. This location is accessible by customers through a wired internet connection or through a wireless device as shown in step 62. It would also be possible for the customer to acquire the coupon, if desired by the business, at their place of business through a direct connection to this system. This would allow shoppers to pick up coupons while in the store, for example, and it would also allow customers who do not have easy internet access to obtain coupons.

When the customers connect with the coupon location, they may select the appropriate coupon in which they are interested and copy it from the master coupon provided at the business site. This coupon may either be printed out directly to the client if it is of the type that can be redeemed simply at the store, or more likely it is placed in a site in the system reserved for each customer as in step 63. It can also be stored in a portable device carried by the customer. This is referred to as a "wallet" so that the customer can go to his site, open his wallet and see which coupons he has available. Since some coupons are held for a length of time and accumulated in order to obtain a benefit large enough for the customer to use, this provides a simple and effective means for storing the coupons. When the customer decides to make a purchase, he goes to the business and brings his merchandise to point of sale 32. He provides a user identity indicator so that the checkout clerk can access his wallet and redeem the appropriate coupons, as shown in step 64. If the coupons are carried in a portable device, it is connected to the point of sale device using a short range radio link, an infrared link or by displaying bar codes which can be scanned into the system. Once the coupon is located and redeemed, the information is recorded as indicated in step 65. If the wallet is located in the server, the information is then forwarded back to the appropriate business 30. If the wallet is carried in a portable device, it is forwarded from the business to the server in order to update their records.

The third party may provide information for the system in terms of joint advertising ventures. Thus, a business such as a bookstore may provide coupons to a third party, such as a coffee shop, for customers who buy a certain book or certain value of books. Thus, the third party is involved in the joint advertising campaign and the coupons are redeemable at their location, but they do not generate the coupons. The third party may also be involved in a different manner such as a sports team whose progress may determine the value of a coupon. For example, if a baseball team scores five runs in a game, the coupon may be redeemed at a store within so many days of the game.

Figure 4:
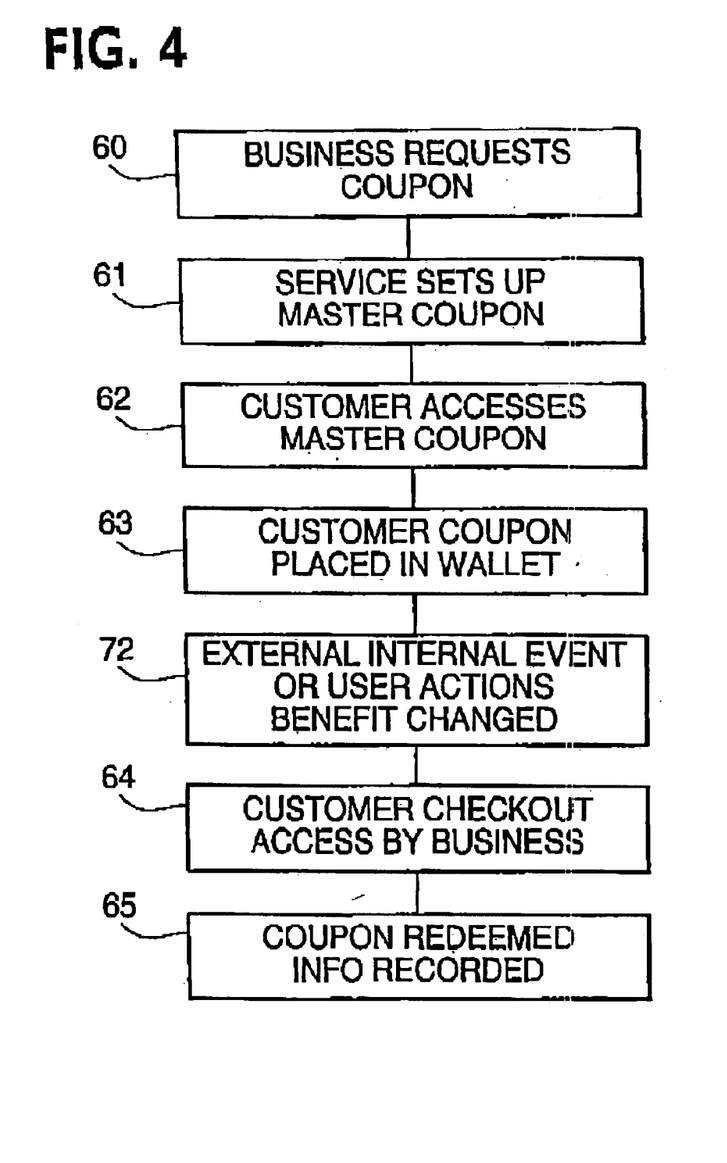
FIG. 4 is a flow diagram showing the steps of the embodiment where the benefits of the coupons is changed.

In this particular system, the coupons may have varying benefits or values. The particular benefits obtained may vary over time or may vary according to external happenings, internal happenings, the amount of purchase or other variables. Since the coupons are stored electronically in a wallet, their value may be affected at a later time depending on the date, purchases of the customer, external happenings such as the score in a baseball game or by internal happenings such as particular actions taken by the customer. This sequence of events is shown in FIG. 4 and includes a series of steps which are similar to those shown in FIG. 2. However, an additional step 72 has been added which indicates that the benefit has been changed after being placed in the wallet and before being redeemed.

Figure 3:
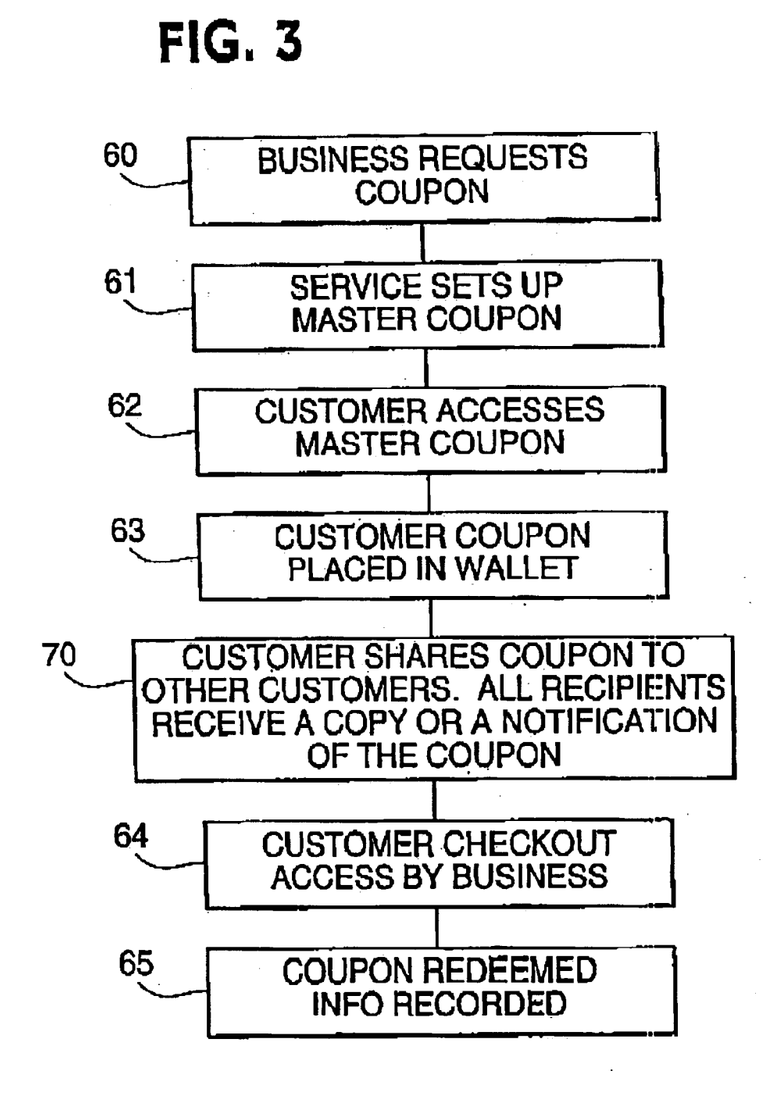
FIG. 3 is a flow chart showing the steps of the embodiment where coupons are shared with other customers.

One particular occurrence which may add value to the coupon is a customer sharing the coupon with another customer as shown in FIG. 3. That is, in order to have the widest distribution of coupons among customers, a customer may gain an extra benefit by passing the coupon along to a friend. Thus, the electronic coupon in the first customer's wallet may be used as a parent coupon and a child coupon is created into the shared customer's wallet. The creating of the child coupon will involve in inheriting specified parent coupon's properties with the inclusion of the general properties of the coupon from the relevant master coupon. The creation process and conditions of the child coupon are specified in the master coupon. There may also be a maximum benefit obtained in this method. Thus, a customer may originally have a coupon worth 25 cents off a certain product which may be worth 35 cents off the same product if the customer passes it on to a second customer and may be worth as much as 50 cents off if he passes it to three customers. This regular feature is called share ability of the coupon. FIG. 3 shows a sequence of steps similar to FIG. 2 except that an additional step 70 occurs after the coupon is placed in the wallet and before it is presented to the checkout clerk. In step 70, the customer shares the coupon with a friend, in order to obtain an additional benefit or merely to share the benefits of the coupon with the friend. When the coupon in the first wallet is copied into another wallet, the information is fed back to the server so that any additional benefit can be credited to the original holder of the coupon.

In addition to coupons being shared to gain extra benefit, they also may be transferrable from one wallet to another. Thus, even though a customer gains no additional benefit, he may be able to pass the savings or other benefit from the coupon to another person. Thus, if he is unable to redeem a coupon for a free product, he may pass the coupon to a friend who may instead redeem it.

Since the coupons are being stored electronically in a wallet, it is not necessary that the customer print out the coupons before going to the store. Instead, it is possible for the customer to give a user identity indicator to the checkout clerk so that the wallet in the server is accessed and coupons which are applicable can be redeemed electronically. If the wallet is carried in a portable device, it may be downloaded to the point of sale device using a short range radio link, an infrared link, or the display of the portable device may show scannable bar codes. This system requires that the customers apply in advance for a user identity indicator in order to establish their wallet. Of course, the number could be generated the first time the customer obtains a coupon. By utilizing a user identity indicator, the service and hence merchants can obtain demographic information about who their customers are. This will allow the merchants to target the specific geographical areas, specific age groups, specific income levels, etc., or target any group which is identifiable by the biographical data given. The coupons could also be used directly when purchasing online from a PC or from a wireless device.

Various internal happenings which can trigger the generation of a coupon or a change in value of a coupon include the location of the customer. That is, if the customer is at a certain location and is reachable by a wireless device, it is possible to notify the customer that he is eligible for a coupon which is redeemable at a nearby store. Other internal triggers include sharing the coupon as indicated above, purchasing a specific item, purchasing a set value of items or being present in a store at a certain time. External triggers are also available which may not be related to the customer's activities. The occurrence of a certain time frame is one common trigger, but it may be something as remote as the score in a baseball game.

Figure 6:
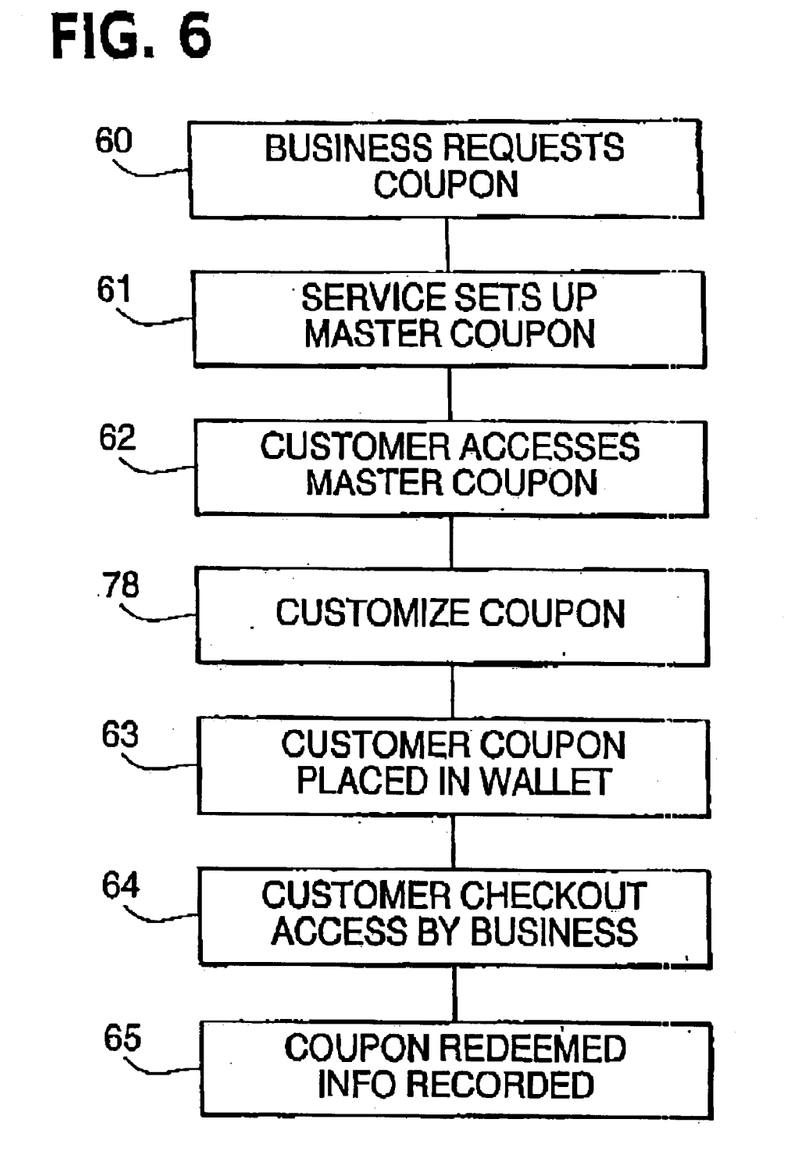
FIG. 6 is a flow diagram showing the steps of an embodiment where the customer can customize the coupon.

It is also possible that certain choices may be relevant to the customer when acquiring the coupon. Thus, the particular benefit may not be completely defined, but instead a list of choices from which the customer may choose may be available. As shown in FIG. 6, the customer may customize the particular coupon he wishes. This is shown in step 78. The other series of steps shown in the figure are similar to those shown in FIG. 2. Thus, after the master coupon is created, the customer can pick various choices as the master coupon allows.

The master coupon can be created in any manner desired by the business. However, one manner to do this is to present a catalogue of choices stored in the server or in another electronic storage device so that the business can locate the specific appearance and information that he wishes for the coupon. This makes it easier for the business to have an attractive master coupon with the appropriate information. The master coupon will have associated therewith particular identification data so that it will be clear where the customer coupon has originated. After the master coupon has been formed, the service organization will place the coupon in a banner ad, or use other accepted on-line advertising methods so that it will be available to the public.

Figure 5:
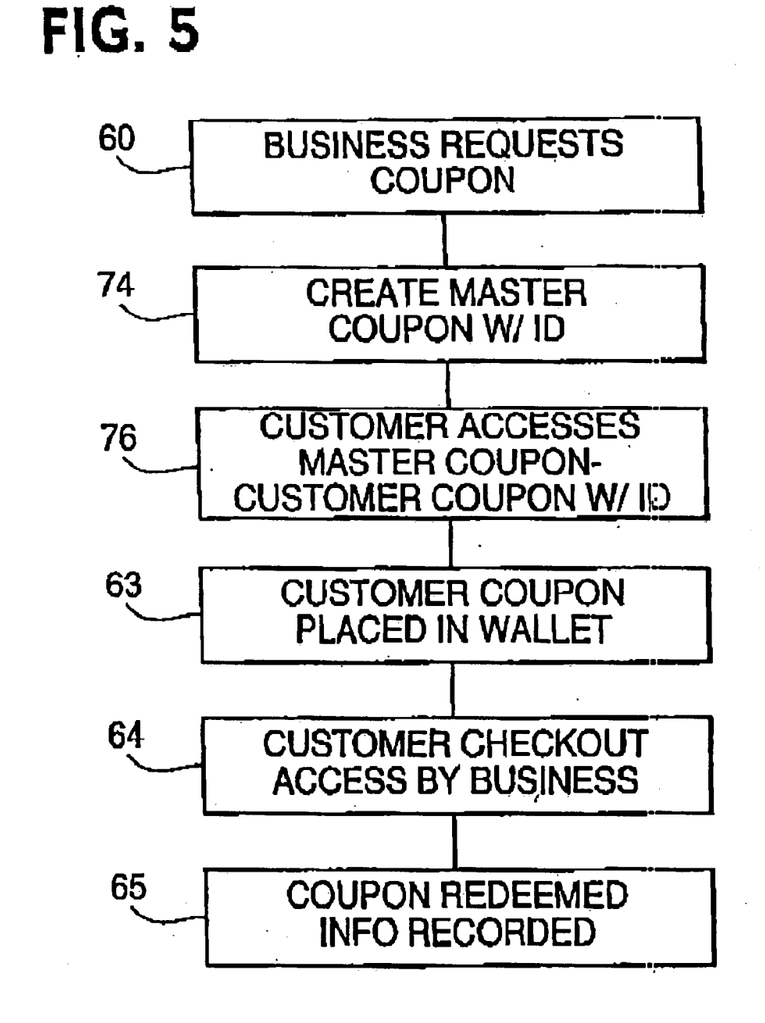
FIG. 5 is a flowchart showing the steps of the embodiment where identification numbers are assigned to both the master coupon and customer coupon.

When the customer copies a master coupon to form a customer coupon, an identification number is also issued for the customer coupon which identifies its parentage and also allows the service organization to keep track of how many coupons are issued and to whom. The identification number is also used in redeeming the coupons. Since the identification on the coupon is matched to a specific customer, it is also possible to require identification from that customer at the time of redeeming the coupon. As seen in FIG. 5, the sequence of steps includes step 74, where the master coupon is created with identification numbers. In step 76, when the customer requests the coupon, the customer coupon is created with identification numbers. The remaining steps in the figure are similar to those in FIG. 2.

Figure 7:
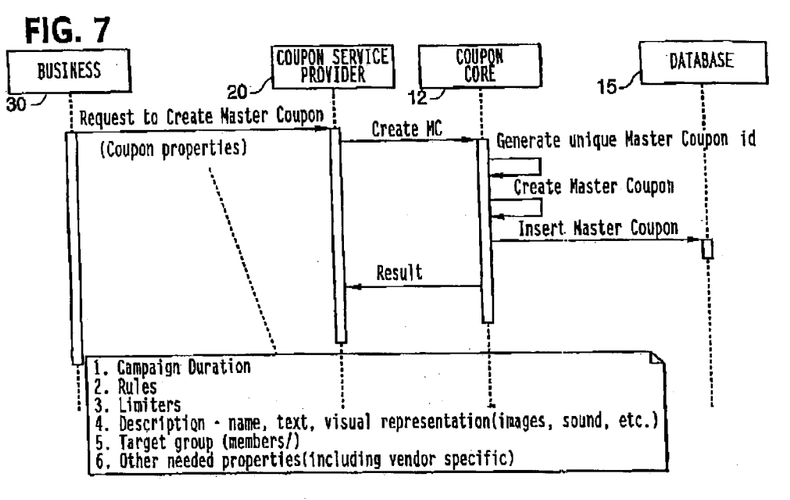
FIG. 7 is a diagram showing the signal flow for the creation of a master coupon.

FIG. 7 is a diagram showing the flow of information in a different format in the creation of the master coupon. This refers to steps 60 and 61 in FIGS. 2–4. As seen in this diagram, the business requests the creation of the master coupon from the coupon service provider. At the same time, the coupon properties are defined as listed at the bottom left hand side of the figure. The coupon service provider creates the master coupon with the properties defined. The coupon system then generates the identification numbers and creates the master coupon in the database for access by customers. After customers have accessed the coupon, the results are then provided back to the service provider.

Figure 8:
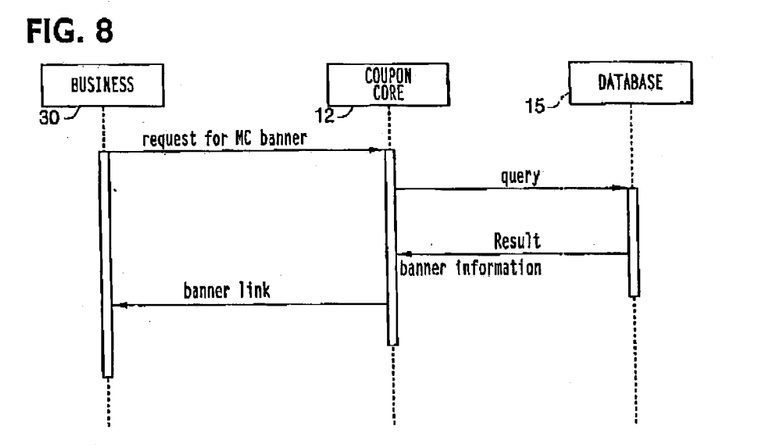
FIG. 8 is a diagram showing the signal flow for embedding a banner.

FIG. 8 shows a similar type of diagram for placing the coupon in a banner. Some third party content provider requests a banner ad for its content and provides the information regarding the target group of the content. The coupon system retrieves a banner arrangement from a database and produces the banner link for the business.

Figure 9:
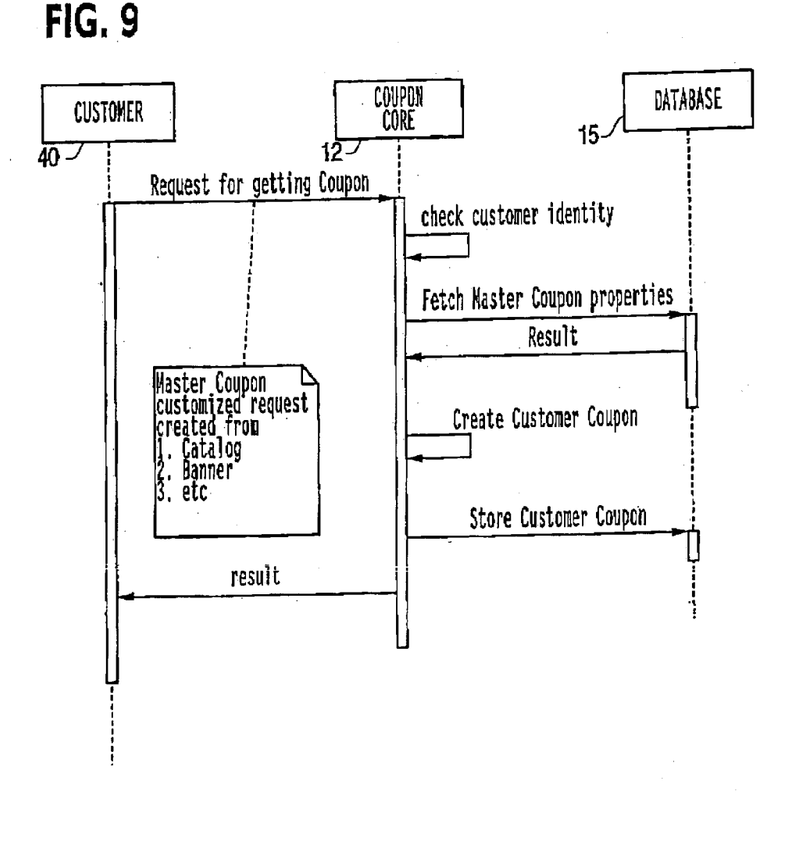
FIG. 9 is a diagram showing the signal flow for the customer acquiring a coupon based on a master coupon.

FIG. 9 is a similar diagram to show how a coupon can be customized by a customer. This refers to steps 62 and 63 in FIGS. 2–4. When the customer accesses the coupon system, the master coupon is displayed in various sources. The customer's identity is checked and the properties of the various coupons are selected from the database. The coupon is then customized according to the customer's desires along with customer identification numbers. This coupon is stored in the database and the results sent to the customer for storage in his wallet.

Figure 10:
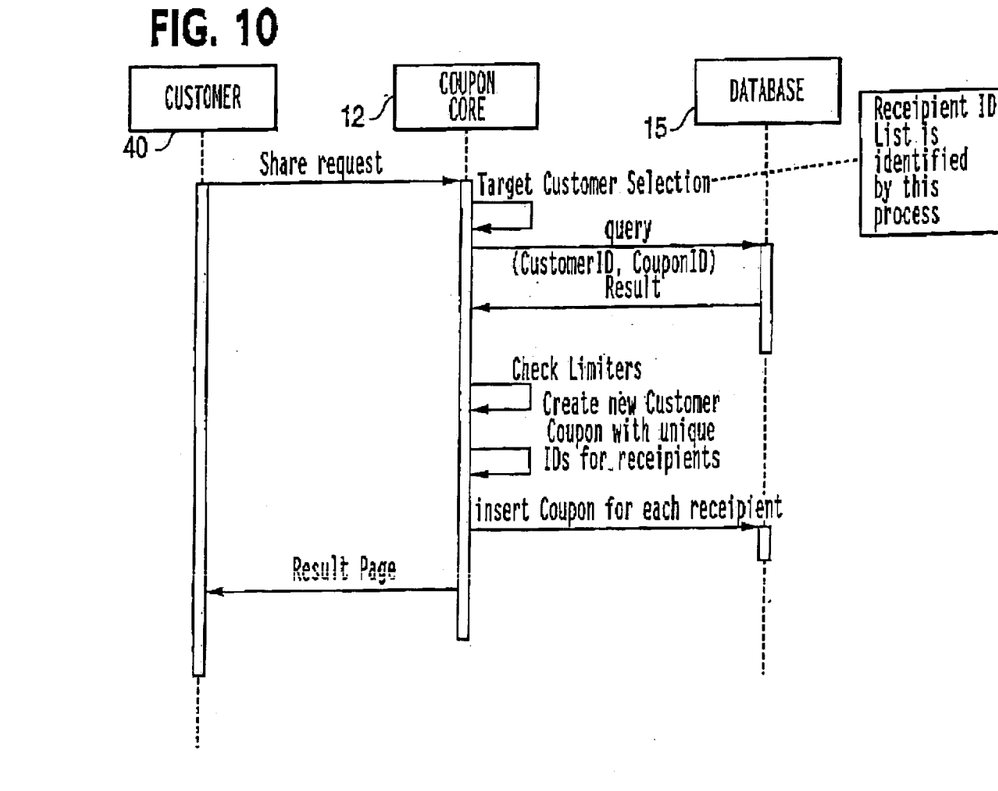
FIG. 10 is a diagram showing the signal flow for sharing a coupon.

FIG. 10 shows a similar diagram indicating how coupons are shared. This refers to step 70 in FIG. 3. The customer having a coupon in his wallet provides a share request to the coupon system. The customer is identified and the recipient customer is defined and reviewed to ascertain that he is eligible for receiving the coupon. Once the database indicates his appropriateness, a new customer coupon is generated with new identification numbers for the recipient customer. The new coupon is placed in that customer's wallet and the initial coupon is modified so that the initial customer is given credit for the sharing procedure.

The following examples are given to demonstrate the versatility of this program. In a first arrangement, a local mobile phone retailer and a local hockey team have a joint advertising venture. The hockey team desires more spectators at their next home game, while the phone retailer wishes to give a discount on their telephones. It is decided that the price of the phone will be lowered a certain amount for every goal scored by the home hockey team. However, the offer is only available to people who attend the game and the offer is valid only for two days following the game. Prior to the game, the service creates an appropriate master coupon in the system. Customers are alerted about the coupons using the hockey teams' ticket holder phone book or the coupons can be sent to visitors using some form of wireless communication such as a cell broadcast, a wireless LAN or a short range radio link such as bluetooth. The price of the cell phones is then calculated based on the score of the game.

A second example is a hamburger restaurant trying to prevent hamburger from being left over at the end of the evening. A discount price is established for the remaining hamburgers when only a certain number of hamburgers remain. The discount may be given according to a formula so that the discount increases as the number of hamburgers in stock decreases so that the greatest discount is for the last few customers. The offer may be given only to people walking by the restaurant and only at a fixed time. In the evening, after the service creates the master coupon, either customer coupons or links to coupons are sent to people within a certain distance within the restaurant by using a wireless communication such as cell broadcast, wireless LAN or short range radio link. Thus, the people may opt into the campaign so that coupons are not pushed to customers without prior acceptance. The discount is given at the time of purchase.

Another example is a bookstore which has a database of loyal customers. For the most active loyal customers, the bookstore decides to give a coupon to buy two books for the price of one on a certain day. However, it is necessary for the customer's convenience to announce the discount at least a week in advance. Accordingly, the master coupon is generated by the service and customer coupons are sent to the loyal customers one week in advance. The coupons are not redeemable until the day of the offer.

Another example is an orchestra which gives two free tickets to the performers. The performers may give the tickets to anyone they know. Thus, the tickets are transferrable and can be forwarded from person to person. The service provides the coupons for the tickets which are then assigned to the performers who may forward them to the wallets of others with the server automatically deleting the original ticket. The coupons can then be redeemed by picking up the tickets at the box office.

Another example is a supermarket who wishes to reward customers for sharing their coupons with others. In order to draw more people into the store, the supermarket offers a discount for diapers which is advertised locally. In addition to the discount for diapers, customers who spread information about the discount also receive a coupon for a free cup of coffee in a coffee shop nearby. Accordingly, the service creates two coupons, one of which is a shareable diaper master coupon and a second is a free cup of coffee master coupon. Customers can acquire the coupons and place them in their wallets. If the customer shares the diaper discount with three friends by placing them in three different wallets, the free cup of coffee coupon is activated. Each coupon can then be redeemed at the appropriate business. In this case, the cup of coffee coupon is activated by the actions of the coupon holder, that is, by sharing the different coupon with friends.

Another example of the use of this system is for a pyramid type marketing campaign. Customers can acquire a coupon for buying tubes of a new toothpaste for a special price. The price can then depend on how many additional tubes are bought by people to whom the customer has contacted. The customer obtains a discount when tubes are bought through coupons he has supplied. If the coupons are passed on to an additional person, that is, if it is transferred twice, the original customer gets a smaller but additional benefit. Thus the value of the discount depends on not only the number of tubes purchased but the "closeness" of the purchaser from the original customer. Thus, the benefit is determined at a later time.

Numerous additional modifications and variations of the present invention are possible in light of the above teachings. It is therefore, to be understood that within the scope of the appended claims, the invention may be practiced otherwise than as specifically described herein.

What is claimed is:

1. A data processing system for issuing coupons, comprising:

a server for generating master coupons at locations attributable to different merchants and for establishing locations attributable to customers for receiving coupons;

a network connection allowing customers to access master coupons at said merchant locations and for the copying of master coupons at locations as customer coupons;

a server for copying the customer coupon as a child coupon for another customer to provide a shared benefit of the customer coupon to the another customer with the child coupon; and wherein said customer coupons have a benefit which varies in accordance with properties defined by the master coupon; and the data processing system modifies the benefit of the customer coupon in response to sharing a benefit of the copied customer coupon with the child coupon.

2. The system according to claim 1, wherein the network connection is an Internet connection.

3. The system according to claim 1, wherein the network connection is a wireless network connection.

4. A method of issuing electronic coupons comprising:

making a master coupon available at an accessible electronic site;

accessing said master coupon;

providing a customer coupon for a customer;

establishing a benefit associated with said customer coupon wherein the benefit is based on properties defined by said master coupon;

sharing the benefit of said customer coupon with another customer by copying said customer coupon as a child coupon for said another customer, with said child coupon inheriting the benefit associated with said customer coupon; and modifying the benefit of said customer coupon in response to the sharing of the benefit of the customer coupon with the child coupon.

5. The method of claim 4, wherein said master coupon includes rules for modifying the benefit of said customer coupon in response for said benefit sharing.

6. The method of claim 5, wherein the rules for modifying the benefit of said customer coupon include increasing the benefit of said shared customer coupon in response to said benefit sharing.

7. The method of claim 5, wherein the rules for modifying the benefit of said customer coupon include providing an additional benefit to said shared customer coupon in response for said benefit sharing.

8. The method of claim 4, wherein said sharing the benefit of said customer coupon with said another customer includes:

making a sharing request including at least identification information of said another customer to whom the benefit of said customer coupon is to be shared with;

determining whether said another customer is eligible for receiving the benefit of said customer coupon based on the identification information; and generating the child coupon if said another customer is eligible for the benefit of said customer coupon.

9. The method according to claim 4, wherein the benefit is shared for a time period.

10. The method according to claim 4, wherein the benefit is variable according to occurrences beyond control of the customer holding the customer coupon.

11. The method according to claim 4, wherein the benefit is variable according to specific acts of the customer holding the customer coupon.

12. The method according to claim 11, wherein said acts include the location of the customer holding the customer coupon.

13. The method according to claim 11, wherein said acts include purchase of a specific item.

14. The method according to claim 4, wherein the customer coupon can be copied as the child coupon into another customer site electronically while retaining the customer coupon.

15. A coupon system comprising:

a data processing system which issues a master coupon, a customer coupon and a child coupon, and wherein;

the master coupon comprises a first indicator describing at least one business at which the master coupon can be redeemed, a second indicator describing a time period during which the master coupon is valid, a third indicator describing at least one additional parameter which effects validity of the master coupon, and a fourth indicator describing a benefit of the master coupon to a redeemer, with the benefit being variable and depending on at least one event occurring after issuance of the master coupon; and the customer coupon comprises a copy of the master coupon reserved for another customer at a reserved site; and wherein the data processing system enables the child coupon to be copied from the customer coupon and to share a benefit between the customer coupon and the child coupon; and the customer coupon has a benefit which the data processing system modifies by sharing the benefit with the child coupon.

16. The system according to claim 15, wherein the sharing of the benefit is variable according to occurrences beyond control of the customer holding the customer coupon.

17. The system according to claim 15, wherein the benefit is variable according to acts of the customer holding the customer coupon.

18. A method of issuing and redeeming coupons, comprising the steps of:

making a master coupon available at an electronic site;

copying said master coupon for a customer as a customer coupon in a wireless terminal;

establishing a benefit associated with said customer coupon wherein the benefit is based on properties defined by said master coupon;

sharing the benefit of said customer coupon with another customer by copying said customer coupon as a child coupon for said another customer with the child coupon inheriting the benefit associated with the customer coupon;

modifying the benefit of the customer coupon in response for the benefit sharing with the child coupon;

presenting said wireless terminal at a business for redeeming said customer coupon with the modified benefit; and connecting said wireless terminal with a point of sale device at said business to redeem said coupon with the modified benefit.

19. The method according to claim 18, wherein the wireless terminal and point of sale device are connected by a short range radio link.

20. The method according to claim 18, wherein the wireless terminal and point of sale device are connected by an infrared link.

21. The method according to claim 18, wherein the wireless terminal has a bar code and the point of sale device has a scanner and the wireless terminal is connected to the point of sale device by displaying bar codes on said wireless device and scanning the displayed bar codes by said scanner of the point of sale device.

22. The method according to claim 18, wherein the modified benefit provides a benefit which is additional to the benefit defined by said master coupon to credit said customer for the benefit sharing.

* * * * *

UNITED STATES PATENT AND TRADEMARK OFFICE
CERTIFICATE OF CORRECTION

PATENT NO. : 6,862,575 B1
DATED : March 1, 2005
INVENTOR(S) : Akseli Anttila et al.

It is certified that error appears in the above-identified patent and that said Letters Patent is hereby corrected as shown below:

<u>Title page,</u>
Item [75], Inventor, please add the following:
-- Hartti Suomela, Sunnyvale, CA, --

Signed and Sealed this

Second Day of August, 2005

JON W. DUDAS
*Director of the United States Patent and Trademark Office*